United States Patent Office 3,031,424
Patented Apr. 24, 1962

3,031,424
POLYMER RECOVERY PROCESS
Walter L. Holmes, San Pedro, and Ronald C. Balfour, Torrance, Calif., assignors to Shell Oil Company, a corporation of Delaware
No Drawing. Filed Nov. 19, 1959, Ser. No. 854,016
10 Claims. (Cl. 260—23.7)

This invention relates to improved processes for the recovery of elastomers. More particularly it relates to the recovery of synthetic elastomers from hydrocarbon solutions thereof.

It is known that conjugated dienes may be polymerized to produce elastomers having a high content of the cis 1,4-addition product. The more useful of the cis 1,4-addition products are those prepared from isoprene and butadiene as they have properties that make them particularly suitable for the manufacture of automobile and truck tires and other applications where natural rubber is used. The prior art directed to the polymerization of conjugated dienes to produce cis 1,4-addition products is well known and will not be described in great detail here. It is sufficient to mention that cis 1,4-polyisoprene is produced by polymerizing isoprene with any of a large variety of hydrocarbyl lithium catalyst. Particularly preferred are the alkyl lithiums as n-butyl lithium, amyl lithium and other normal alkyl lithiums having from 2 to 10 carbon atoms. Such polymerizations are conducted at temperatures ranging from about 25° C. to about 100° C. at ambient pressures. The quantity of catalyst employed may be as low as .03 millimole per mole of isoprene and may be as high as 2 millimoles per mole of the isoprene.

The cis 1,4-polybutadiene is best prepared with a catalyst that is the reaction product of a transition metal compound, particularly halides, of a group IV to VIII metal and a strong reducing agent. The reducing agent may be, for example, a metal compound, particularly organo-metalic, of a group I-III metal. Of the numerous reducing agents that may be employed organo-aluminum compounds are favored and are most often described as being useful to produce the polybutadiene having a high content of the cis 1,4-addition product. Fairly representative catalyst composition for this purpose include the following reaction products:

$TiCl_3$—$AlEt_2Cl$    $CoCl_2$—$AlEt_2Br$
$VaCl_3$—$AlEt_3$    $CoCl_2$—$AlEt_3$
$TiCl_3$—$AlEt_3$    $CoCl_2$—$AlBu_3$
$TiCl_3$—$ZnEt_2$    $ZrBr_2$—$AlBu_2Cl$
$TiCl_4$—$AlBu_2Cl$    $NiCl_2$—$AlCl_3$—$AlEt_2Cl$

Still many other combinations are known for the formation of cis 1,4-polybutadiene but it may be stated that transition metal halides of group IV, particularly of titanium, are preferred for use with organo-aluminum compounds. As in the case of butadiene, the polymerization temperature range from about 25° C. to about 100° C. at ambient pressure and the mole ratios are such that more often the metal halide is present in molar excess of the organo-metallic compound.

Another class of highly useful elastomers are the copolymers of ethylene and propylene which are produced by polymerizing a mixture of the monomers with a catalyst comprising the reaction product of vanadium oxychloride and a reducing agent of the type previously described.

The elastomers are produced under conditions that exclude atmospheric impurities particularly oxygen and water. Additionally, impurities as sulfur, sulfur-containing compounds, oxygen-containing compounds, and the like are also to be excluded if a polymer is to be obtained that falls within the useful rubber range. The polymerizations are conducted in the presence of liquid inert diluents as isopentane, hexane, gasoline, benzene, toluene and the like. As the polymerization proceeds the elastomer forms and remains in solution until it is to be recovered. Heretofore recovery of the elastomer in a suitable form has been very difficult and, as far as it is known, has not been suitably achieved. This invention provides highly suitable processes for the recovery of elastomers from hydrocarbon solutions thereof. Before considering the invention in detail it will be useful to a better understanding of the invention to consider some of the problems involved in the recovery of the elastomers.

The elastomers that are in solution of a hydrocarbon diluent may be recovered by adding to the solution a coagulating agent as isopropanol, ethanol, acetone, or the like, whereupon the polymer coagulates as a crumb. The crumb is recovered and then dried whereby the solvent and coagulating agent are removed. Unfortunately, much of the solvent and coagulating agent become occluded in the elastomer and these liquids are extremely difficult to remove in an economical fashion. Removal of these liquids to about less than 1%, by weight, is necessary or else they will cause rubber products to blister and weaken during vulcanization. Actually, it is best to remove the liquids to less than 0.5%, by weight, or lower but this, heretofore, could not be done economically—mainly because the coagulated crumb is of rather high density whereby occluded liquids are extremely difficult to drive out without damaging the elastomer. Furthermore, when the crumb was subjected to heat during drying it became more tacky thereby causing greater compacting and held the liquids still more firmly.

It is an object of this invention to provide processes for the recovery of elastomers from hydrocarbon solutions thereof. It is another object to effect such a recovery of the elastomer as a driable crumb which is substantially free of hydrocarbon solvent. It is yet another object of this invention to recover elastomer from hydrocarbon solutions as a crumb which is substantially tack-free. Other objects will become apparent as the description of the invention proceeds.

These and other objects are accomplished in the process for the recovery of synthetic elastomers from hydrocarbon solutions thereof comprising admixing and dissolving a normally solid organic acid in the hydrocarbon solution of the elastomer to form a homogeneous blend. Thereafter the blend is treated to coagulate and recover the elastomer from the solution. The coagulated elastomer will then exist as a crumb that is substantially tack-free. A surprising finding is that the elastomer crumb is not only substantially tack-free but it exists as distinct individual particles that facilitates complete and thorough drying. Because the organic acid and elastomer exist as true solutions before coagulation, thorough and complete mixing is simple so that the coagulated crumb may contain some acid homogeneously blended into the crumb and the amount of the remaining acid may vary depending on the particular technique of coagulating the elastomer. At later stages of processing the remaining acid may be converted into an acid salt which may be used in the formulation of rubber compositions. Thus, for example, stearic acid may be converted to zinc stearate on milling or Bambury mixing zinc oxide into the crumb.

As previously indicated the synthetic elastomer at the beginning of this process is in the form of a true solution in an inert hydrocarbon diluent. The solutions of the elastomers may be prepared by any means and the preparation of such solutions form no part of this invention. It is to be noted, however, that the hydrocarbon solutions of the elastomers usually are quite viscous because of their high molecular weight. In the actual practice of this invention, the concentration of the elastomer in the solvent is immaterial although it may range from about 5 to about 35% solids, by weight, and more usually within the range of about 10 to 25%, by weight. Because the elastomer solution is usually quite viscous it is easier to put the acid into the hydrocarbon solution of the elastomer by first preparing a hydrocarbon solution of the acid in a separate vessel and the thus prepared solution is mixed with the elastomer solution. If desired, however, the organic acid may be mixed directly with the elastomer solution. The mixture of elastomer solution and organic acid, either as a solution or in the free state, are thoroughly blended until a homogeneous composition is obtained. Thereafter the elastomer may be recovered as a solid crumb by feeding the solution into a vessel containing hot water at any temperature above the boiling point of the hydrocarbon solvent. Alternatively, the elastomer may be recovered by mixing the elastomer solution with a coagulating agent of the type previously described.

The organic acid that is employed in the present invention may be any normally solid organic acid. In the more preferred embodiments the organic acid is selected from those which are more commonly employed in the formulation of rubber compositions as the acid salts. This is best illustrated by the selection of stearic acid which very commonly is a component in rubber compositions in the form of zinc stearate. With that acid the subsequent addition of zinc oxide will convert the acid to zinc stearate. Because the normally solid, fatty acid may be selected from a very large group the choice of a particular acid may govern some aspects of subsequent processing as will be understood by persons skilled in the art. Thus, if the acid has in the order of about 10 to 12 carbon atoms more acid may be required. Conversely, if the acid has, say, 20 carbon atoms then less acid may be required but milling times may be somewhat longer. Also, depending upon the acid the rubber formulation may require modification and such matters again will be understood by rubber chemists.

Any of the various organic carboxylic acids including those which are monobasic and polybasic and those which are aliphatic and cyclic, whether aromatic, alicyclic or heterocyclic, may be utilized in the instant processes. Mixtures of several different acids may also be used. Illustrative acids within this class include capric acid, lauric acid, myristic acid, palmitic acid, stearic acid, nonadecanoic acid, behenic acid and other saturated aliphatic monocarboxylic acids and mixtures thereof; oleic acid, linoleic acid, ricinoleic acid, sorbic acid, and other unsaturated monocarboxylic acids; succinic acid, glutaric acid, adipic acid, suberic acid, azelaic acid, sebacic acid, tricarballylic acid, citric acid, 4,8-dithia-6-oxahendecadeioic acid, 3,7-dithia nonandioic acid, and other saturated aliphatic dicarboxylic and polycarboxylic acids; glutaconic acid, muconic acid, and other unsaturated aliphatic di- and polycarboxylic acids; the toluic acids, naphthoic acid, cyclohexane acetic acid, furoic acid, and other monocarboxylic, aromatic, alicyclic and heterocyclic acids; phthalic acid, terephthalic acid, tetrahydrophthalic acid, hemimellitic acid, trimellitic acid, trimeric acid, naphthalic acid, cyclohexanediacetic acid, 2,2'-bis-(4-carboxymethyl-phenyl)propane, and other polycarboxylic carbocyclic (aromatic) and cyclic acids. In addition, polymeric acids such as polyacrylic acid, polymethacrylic acid and complex acids and mixtures of acids from natural sources such as soybean fatty acids, pectic acid, rosin acids and others that are soluble in hydrocarbon solvents. Organic acids having from 10 to 26 carbon atoms are preferred and particularly preferred are those having from 14 to 22 carbon atoms. Of all the organic acids the saturated aliphatic monocarboxylic acids having from 18 to 20 carbon atoms, as oleic acid, stearic acid and the like will be used most frequently as they have advantages of cost and ease of handling.

The organic acid, as previously indicated, is preferably added as a hydrocarbon solution which may be prepared in any convenient way which most simply comprises charging a vessel, containing the inert hydrocarbon solvent, with the acid and thereafter stirring the mixture until the fatty acid is in solution. If desired, elevated temperatures may be employed to hasten the formation of the solution. In the preferred procedures the hydrocarbon diluent that is used in the preparation of the acid solution will be the same as that employed in the preparation of the polymer solution. The solvent may be different and while such a procedure is fully operable, increased operating costs may result because of the separation of the solvents before reuse.

The concentration of the organic acid in its solution is immaterial because the quantity that is employed ultimately is based on the weight of the elastomer in solution. Accordingly, the preparation of the acid solution is governed mainly by matters of convenience. A convenient concentration is in the order of about 10 to about 20 parts by weight of organic acid in a hydrocarbon diluent although, as previously indicated, this is strictly a matter of choice.

After the solution of the organic acid and the solution of the polymer are prepared, and preferably contained in separate vessels, the two solutions are mixed so that there is ultimately contained in the total mixture the desirable amount of the acid, based on the elastomer solids. This, of course, will vary as desired but amounts ranging from about 1-8% by weight of acid are most common with amounts in the order of about 2-6% being used for the more preferred species of acid. The specific amount will vary depending on such considerations as the choice of the acid and the particular elastomer involved. These amounts of added acid are not to be confused with the amount of acid remaining in the coagulated and recovered elastomer. In actual practice the amount of acid that remains in the final elastomer will inevitably be less than that which is added because some leaching of the acid will take place during the coagulation step. A surprising feature of the present invention is that the amount of organic acid remaining in the final product may actually be quite low and yet be effective in permitting recovery of the elastomer in an effective manner. The amount of the acid that may remain in the final elastomer appears to be as little as 0.05% although drying times with such small amounts may be somewhat longer. Any amount in excess of the 0.05% by weight is suitable which amount, of course, will not exceed the amount of acid which is added in the first instance.

Because the elastomer may be recovered with such a small amount of the organic acid remaining in the final product it will be seen that the processes of the present invention may be usefully employed to produce elastomers which are, for all practical purposes, essentially free of the acid and this is yet another important feature of the present invention. In general, it may be stated that the amount of acid remaining in the final product is governed mainly by the conditions used to coagulate and separate the elastomer which conditions may involve a combination of temperature, time, mixing conditions, coagulating agent, and the like.

The invention is described and illustrated in greater detail in the following examples.

*Example I*

A solution of stearic acid in isopentane is prepared by charging a vessel containing 400 pounds of isopentane with 80 pounds of stearic acid. The mixture is agitated until a withdrawn sample is free of any suspended solids. The thus prepared solution is then added to an isopentane solution of cis 1,4-polyisoprene in a different vessel. The cis 1,4-polyisoprene solution is prepared by charging a polymerization vessel with commercial isopentane (95% isopentane and 5% n-pentane) followed by charging 2,080 pounds of isoprene so that the total charge constitutes 16.5%, by weight, of isoprene. Thereafter 0.4 pound of n-butyl lithium is added to the reactor and with continuous agitation the polymerization begins. The polymerization vessel is closed to the atmosphere and the several materials are charged so that they do not come in contact with the air. Because of an exotherm the temperature rises to about 55–65° C. and the pressure developed in the reactor reaches about 32 p.s.i.g. After about 1⅓ hours the polymerization is complete and a sample withdrawn for the elastomer solution is coagulated by mixing with isopropanol. The coagulated elastomer contains about 92% of the cis 1,4-addition product and has an intrinsic viscosity of 7.4 dl-gram measured in toluene at 25° C. By the coagulation, the solids content of the polymer in the solution is determined to be 16.5% by weight and to this solution is added sufficient acid solution to provide 4% stearic acid, by weight, based on the solids of the polyisoprene solution. The two solutions are thoroughly blended for a few hours to provide a homogeneous mixture. Thereafter the elastomer is coagulated by feeding the elastomer solution into a vessel containing hot water at 160° F. The solid cis 1,4-polyisoprene floats to the top of the vessel and is recovered as a crumb of discrete particles which are substantially tack-free. During the drying operation the crumb remains as discrete particles and is recovered as such and contains about .2% of volatile liquid consisting mainly of water and 0.8% stearic acid. The drying is at 175° F. for 60 to 90 minutes.

In companion observations, when elastomer solution that has not been blended with stearic acid is subjected to the coagulation, the elastomer crumb is recovered in large chunks which, after drying, contain much occluded isopentane and water, i.e., about 8%, by weight.

*Example II*

The procedure of Example I is repeated on a smaller scale except in this case the acid is used in amounts of about 2%, by weight, of the solid polyisoprene. The polymer crumb exhibited more tackiness than in Example I but the crumb dried satisfactorily. In a companion case the stearic acid was used in amounts of about 6%, by weight. In this case the coagulated crumb was tack-free and on hand squeezing did not adhere together as a single lump.

*Example III*

The procedure of Example I is repeated on a smaller scale except that the organic acid is palmitic acid. In this case substantially the same results are obtained.

*Example IV*

The procedure of Example I is repeated except that the acid employed is a modified form of oleic acid which acid is identified as Emery Industries Acid 997–S. In several experiments varying amounts of the oleic acid are employed, i.e., 1, 3, and 5 parts per hundred of the acid based on the solid content of the cis 1,4-polyisoprene solution. It is found that the results are essentially the same with the modified oleic acid as with stearic acid but it is noteworthy that the use of the oleic acid has the advantage that it is more readily soluble in hydrocarbon solvents. This, together with its low cost, makes it a more attractive embodiment of the present invention.

*Example V*

Cis 1,4-polybutadiene, as a solution in benzene, is prepared by polymerising a saturated solution of butadiene in benzene with a catalyst consisting of the reaction product of titanium trichloride and aluminum diethylchloride in a mole ratio of 2.5:1. In this case the stearic acid solution is prepared in benzene and is blended in the butadiene solution in an amount in the order of 5%, by weight, of the cis 1,4-polybutadiene. The recovered crumb, after drying at 180° F. for 90 minutes, is tack-free and contains about 0.1% water and only a trace of benzene. Because the benzene has a higher boiling point than the solvent of the previous examples, the hot water used for the coagulation of the elastomer is at a temperature ranging from 200–208° F. Additionally, the residence time of the crumb in the hot water vessel is longer. These modifications remove about 98% of the benzene from the wet crumb.

*Example VI*

The procedure of Example V is repeated except that the acid in this case is a disproportionated rosin acid. The recovered crum is tack-free and readily dried to contain less than 0.5% water and benzene.

*Example VII*

The procedure of Example I is repeated on a smaller scale using linoleic acid. The recovered elastomer is substantially tack-free and dries to less than about 0.3%, by weight, of volatiles. This particular sample, when used in conventional rubber formulations, is found to be somewhat less stable, probably because of the use of the unsaturated acid.

*Example VIII*

The procedures of Example I are repeated in all respects except that the elastomer is an amorphous copolymer of ethylene and propylene in heptane. The elastomer solution is prepared by charging to a 5 liter vessel one liter of dry, oxygen-free heptane and one millimole of triisobutyl aluminum. Thereafter, the heptane is saturated with a mixture of ethylene and propylene by bubbling a mixture of the gases through the heptane. The mixed gases are in a mole ratio of ethylene to propylene of 1:2.5. Thereafter, .3 millimole of vanadium tetrachloride is added and the polymerization starts soon thereafter. The various components are charged under conditions that prevent contact with the atmosphere and with constant agitation. During the polymerization there is a slight exotherm and the polymerization is carried out at 50° C. As the polymerization continues the solution becomes increasingly viscous and after about 30 minutes the polymer solution is recovered by the same procedure described in Example I. Although the solvents are different, substantially the same results are obtained. The ethylene-propylene copolymer is recovered as a crumb of discrete particles and analyses indicate that the copolymer contains about 50% of polymerized ethylene. The elastomer is amorphous and on stretching it crystallizes. This application is a continuation-in-part of Serial No. 794,802, filed February 24, 1959, now abandoned.

We claim as our invention:

1. The process for producing a solid, substantially tack-free crumb of a synthetic elastomer from hydrocarbon solutions thereof comprising mixing the hydrocarbon solution of an elastomer selected from the group consisting of cis 1,4-polyisoprene, cis 1,4-polybutadiene and amorphous ethylene-propylene copolymer with a normally solid organic fatty acid until a homogeneous solution thereof is obtained, said hydrocarbon solution of the elastomer being essentially free of water, and thereafter coagulating the elastomer by mixing the solution with water at a temperature above the boiling point of the solvent.

2. The process of claim 1 wherein the fatty acid is dissolved in a hydrocarbon solvent and the two solutions are mixed.

3. The process of claim 2 wherein the hydrocarbon solvents are the same.

4. The process of claim 1 wherein the elastomer is the cis 1,4-addition product of isoprene.

5. The process of claim 1 wherein the elastomer is the cis 1,4-addition product of butadiene.

6. The process of claim 1 wherein the elastomer is an amorphous copolymer of ethylene and propylene.

7. A composition which comprises a homogeneous solution of a synthetic elastomer selected from the group consisting of cis 1,4-polyisoprene, cis 1,4-polybutadiene and amorphous ethylene-propylene copolymer and a normally solid organic fatty acid dissolved in an inert hydrocarbon solvent, the solution being essentially free of water.

8. The composition of claim 7 in which the elastomer is cis 1,4-polyisoprene.

9. The composition of claim 7 in which the elastomer is ethylene-propylene copolymer.

10. The composition of claim 7 in which the elastomer is cis 1,4-polybutadiene.

References Cited in the file of this patent

UNITED STATES PATENTS

| | | |
|---|---|---|
| 2,766,224 | Bannon | Oct. 9, 1956 |
| 2,773,780 | Koenecke et al. | Dec. 11, 1956 |
| 2,905,649 | Craig et al. | Sept. 22, 1959 |
| 2,980,639 | Braendle | Apr. 18, 1961 |